Figure 1:
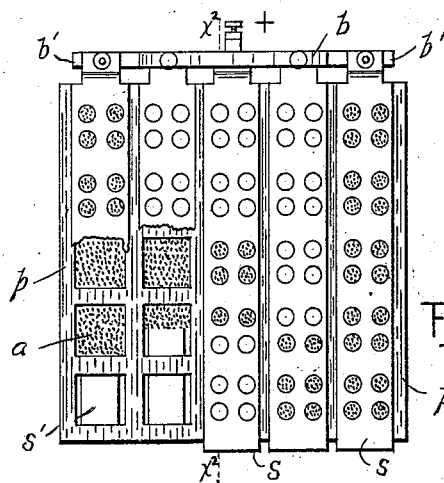

(No Model.) 2 Sheets—Sheet 1.

J. J. ROONEY.
SECONDARY BATTERY PLATE AND METHOD OF PREPARING IT.

No. 549,023. Patented Oct. 29, 1895.

WITNESSES:
Hy H. Whitman
Anson Baldwin.

INVENTOR
John J. Rooney.
BY Thomas Ewing Jr
ATTORNEY.

(No Model.) 2 Sheets—Sheet 2.
J. J. ROONEY.
SECONDARY BATTERY PLATE AND METHOD OF PREPARING IT.
No. 549,023. Patented Oct. 29, 1895.
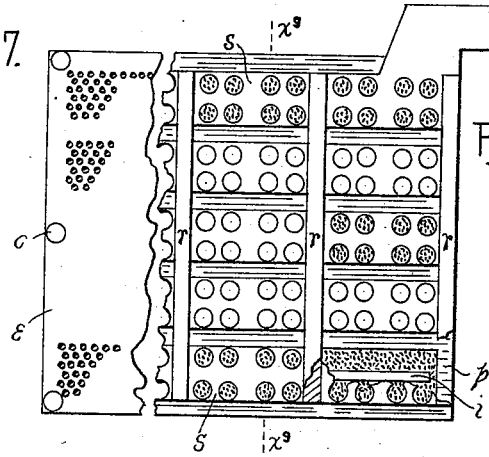
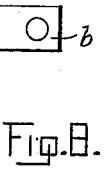
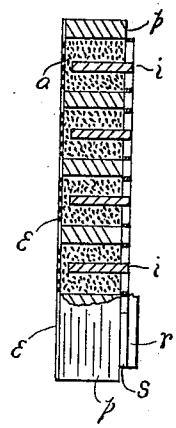
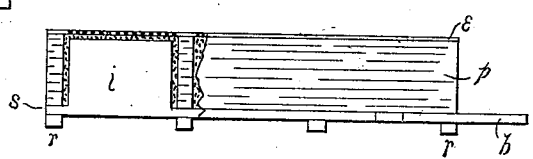
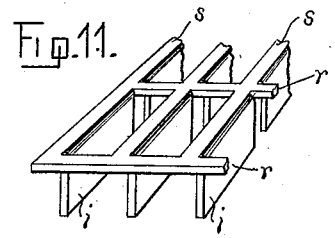
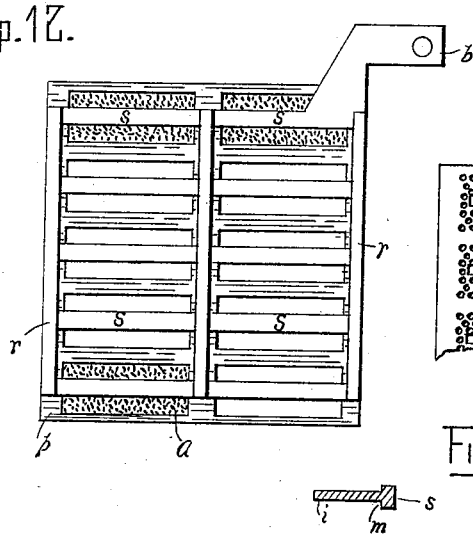
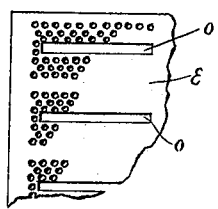
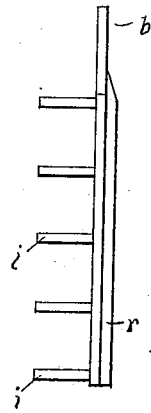
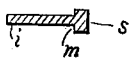
WITNESSES:
INVENTOR
John J. Rooney.
BY Thomas Ewing Jr.
ATTORNEY.

UNITED STATES PATENT OFFICE.

JOHN J. ROONEY, OF BROOKLYN, NEW YORK.

SECONDARY-BATTERY PLATE AND METHOD OF PREPARING IT.

SPECIFICATION forming part of Letters Patent No. 549,023, dated October 29, 1895.

Application filed April 1, 1895. Serial No. 543,939. (No model.)

*To all whom it may concern:*

Be it known that I, JOHN J. ROONEY, a citizen of the United States of America, residing at Brooklyn, Kings county, New York, have invented certain new and useful Improvements in Secondary-Battery Grids and Plates and Methods of Preparing Grids, of which the following is a specification.

In a secondary cell as ordinarily constructed there is a series of parallel grids or supports with active material or material to become active combined therewith. These supports have to be thick enough to receive a large amount of active material, and consequently increase the weight of the cell over that necessary for making good contact with the active material; also, the arrangement of the plates or electrodes must be such that short-circuiting, due to buckling or dislocation of active material, cannot take place by separating the plates far enough or by interposing asbestos sheet or other such means. The plates are immersed in a suitable liquid and so connected and charged that adjoining plates are converted into elements of contrary polarities.

My battery, as herein described and claimed, consists, preferably, though not necessarily, of a series of plates; but as I construct it, each plate, instead of being either positive or negative, may be composite, in that it may contain both positive and negative parts separated by insulating material. The best insulating material known to me for this use is compressed paper. This has the advantage that it is porous as well as insulating. The paper sheet is perforated with holes, which, after the sheet is cut to the required dimensions, are filled with active material or material to become active. The active material filling the holes or perforations forms pellets. The pellets are connected either alternately to the positive and negative terminals, so that adjacent pellets when charged will be of contrary polarity, or all are connected together to form a single element. The electrolytic chemical action takes place in the mass of liquid outside the plate and also in the liquid which saturates the separating walls of paper. A single plate immersed in a suitable liquid may form either a complete battery or a positive or negative element.

Figure 2:
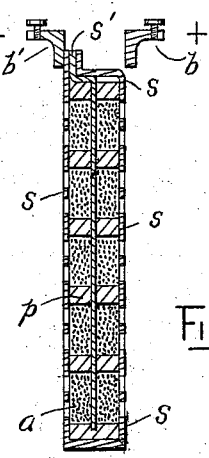
Figure 3:
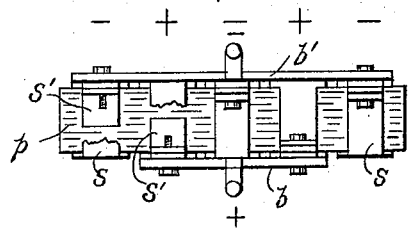
Figure 4:
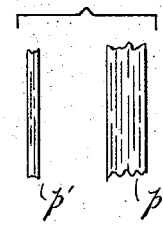
Figure 5:
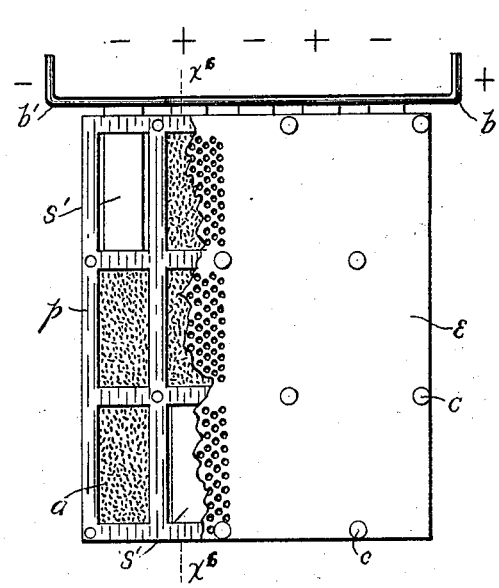
Figure 6:
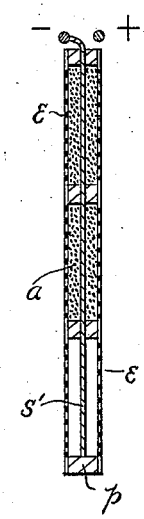

In the accompanying two sheets of drawings, Figure 1 is a side view of one form of my composite plate partly broken away at one of the lower corners. Fig. 2 is a vertical section of this plate through the line $x^2 x^2$ of Fig. 1 and also through the terminal posts. Fig. 3 is a top view. Fig. 4 are edge views of the insulating compressed paper in which $p'$ is the original thickness and $p$ the thickness to which it swells when treated with sodium caustic solution. Fig. 5 is a side view of a modified form of plate partly broken away at the left, and Fig. 6 is a vertical section through the line $x^6 x^6$ of the plate shown in the preceding figure. Fig. 7 is a broken side view showing a celluloid cover $e$, which is attached to the opposite side of the plate from that shown in Fig. 8. Fig. 8 is a side view of another modification of plate partly broken away, and Fig. 9 is an edge view of this plate partly broken away along the line $x^9 x^9$, the lower part showing the rib $r$. Fig. 10 is a top view partly broken away and showing a projecting conductor $i$ embedded in the active material. Fig. 11 is a perspective of another form of conducting-frame having strips $s\ s$ and projecting conductors $i\ i$, which may be stamped from one sheet of metal. Fig. 12 is a side view of a plate having another form of conducting-frame, the celluloid covers not being shown; and Fig. 13 is an edge view of this frame. Fig. 14 shows a perforated celluloid cover having slits or openings through which the projecting conductors are inserted before placing the conducting-frame upon the paper grid. Fig. 15 is a sectional view of a projecting conductor $i$ and frame $s$, showing a shoulder $m$, which holds the celluloid cover against the paper grid.

For the insulating material $p$, I use ordinary compressed paper or press-board. This paper is also called "binders' board." This is hard, dense, and light. It is first perforated with holes, preferably of narrow or oblong shape, and regularly disposed with respect to one another, so that the paper will be left in narrow walls of uniform thickness between adjoining perforations.

The hardness and density of the paper is, of course, due to the compression to which it has been subjected in the preparation, and the sizing, which consists of resinous or other gummy matter, generally speaking, is necessary to hold the paper together. Without this sizing it would be difficult to perforate the paper with dies or punches or in any other convenient manner. After being perforated, the paper is freed from resinous and other gummy matter to leave, as far as is possible, only vegetable fiber.

The basis of the paper is, of course, vegetable fiber before it is treated; but the treatment which I herein suggest removes the sizing and reduces it to vegetable fiber by removing substantially all the matter which goes to make up the paper, except the vegetable fiber. One way of doing this is by treating it with a solution of sodium caustic for from twelve to twenty hours. This treatment does not destroy the firmness of the paper. Either immediately or after the paper has dried it is immersed in dilute hydrochloric acid. The acid and the sodium caustic left in the tissues by the preceding operation react upon each other, and when chemical action has ceased the paper is immersed in water to wash it and dissolve out any sodium chloride present therein. If desired, these three operations of treating with sodium caustic, with hydrochloric acid, and with water can be conducted in one tank by withdrawing one liquid and filling with the next, as required.

The paper, after treatment, is soft and pliable, but firm and in its original shape, but very much thicker, the deepening of the perforations being three or four times without any distortion of them. A grid, capable of receiving a large amount of active material of very light weight is thus obtained, having the additional value of being porous and exposing the active material on all sides to the electrolyte. The conducting-strips $s'$ $s'$ are next pushed through the middle of the paper walls and so guided that each passes through an entire row of perforations, which, while the paper is still wet, may be filled with the active material or material to become active. This results in a set of parallel rows of perforations with a conductor in contact with the active material in each row.

The exterior conducting-strips $s$ $s$ lie across the perforations and make contact with the pellets of active material and also keep them from falling out. They are perforated to allow the escape of gas and the exposure of part of the faces of the pellets to the electrolyte. The conducting-strips $s$ $s'$, with which any given row of pellets are thus connected, are brought together at the top of the plate, and alternate pairs of strips $s$, with their respective interior strips $s'$, are joined by bolts or otherwise to the negative terminal bars $b'$ of the cell and the intermediate strips to the positive bar $b$.

It will be seen in this and all the other constructions shown in this application all the positive conductors are connected together and all the negative conductors are connected, but the positive conductors and negative conductors are insulated from each other. This, of course, is necessary. It may therefore be stated that there are positive and negative sets of conductors insulated from each other, the conductors being in contact with the active material.

In the construction shown in Figs. 5 and 6, having only interior conducting-strips $s'$ $s'$, each positive and negative strip is connected to its respective terminal bar $b$ or $b'$. As is here shown, conducting-strips do not cross and secure the pellets of active material. For this purpose perforated celluloid covers $e$ are fastened to the paper grid by celluloid or metallic buttons $c$.

Figs. 7, 8, 9, 10, 11, and 12 show a construction in which the perforated grid is used as either a single negative or a positive electrode when combined with active material. In this the conducting-strips $s$ and the projections $i$ are preferably cast in one piece, having ribs $r$ $r$ to give strength and rigidity. Fig. 8 shows the conducting-strip $s$ on one side only and having perforations to expose the pellets of active material. These perforations do not interfere with the strips holding the active material in place. On the opposite side of the grid the active material is held in place by a perforated celluloid cover $e$. This is fastened to the plate by celluloid buttons $c$ $c$ or by other suitable means.

Figs. 11 and 12 show a form of plate in which celluloid covers $e$ are used on both sides, that on one side having slits or openings to allow the projecting conductors $i$ $i$ to pass through and the cover to come flush against the shoulders $m$. (Shown in Fig. 15.)

It will be seen that if one of the forms shown in Figs. 1 to 6, inclusive, is used that electrolytic action will take place through the walls separating the rows of active material and also outside of the grid in the mass of the liquid which fills the vessel. Instead of immersing only one plate in the vessel, two or more may be used and all their negative and positive poles respectively connected. If the plates are made all alike, they may be packed quite closely without danger of short-circuiting the cell, since pellets of active material or strips of like polarity will lie opposite each other. Electrolytic action will then take place not only between different pellets of the same plates, but diagonally through the liquid between positive and negative pellets of different plates.

If one of the forms shown in Figs. 7 to 15 is used, the electrolytic action is the same as in cells of the usual construction, except that the electrolyte permeates the support or grid.

If the perforations are filled when the paper is wet, upon the paper drying the pellets will project beyond the surface of the paper. When the plate is immersed in the liquid of the battery, the paper becomes saturated and swells up. This will cause the exterior lead-conductors to be pushed outwardly from the active material unless they are strong enough to resist this, or the plates are packed so tightly that the lead-conductors cannot be forced outwardly. The strips of lead which pass down through the middle of the paper grid and the projections from the exterior conductors surely prevent loss of contact. If the plates are packed in closely, they should be separated by suitable strips, so that the circulation of the liquid shall not be interrupted.

Without limiting myself to the exact details shown, what I claim, and desire to secure by Letters Patent of the United States, is—

1. A secondary battery plate consisting of a grid of press-board paper with the sizing removed, rows of perforations therein, active material or material to become active filling the perforations, and conducting strips each being in contact with the active material in one row of perforations, substantially as described.

2. A composite secondary battery plate made up of a grid of insulating material, parallel rows of perforations therein, active material or material to become active filling or occupying the perforations, and alternate positive and negative conductors, each conductor being in contact with the material in one row of perforations, substantially as described.

3. A composite secondary battery plate made up of a grid of porous paper, parallel rows of perforations therein, active material or material to become active filling or occupying the perforations, and alternate positive and negative conductors, each conductor being in contact with the material in one row of perforations, substantially as described.

4. A secondary battery cell consisting of a liquid in which is immersed one or more composite secondary battery plates each made up of a grid of insulating material, parallel rows of perforations therein, active material or material to become active filling or occupying the perforations, and alternate positive and negative conductors, each conductor being in contact with the material in one row of perforations, substantially as described.

5. A secondary battery cell consisting of a suitable liquid in which is immersed one or more composite secondary battery plates made up of a porous paper grid, parallel rows of perforations therein, active material or material to become active filling or occupying the perforations, and alternate positive and negative conductors, each conductor being in contact with the material in one row of perforations, substantially as described.

6. The method of preparing secondary plates which consists in perforating a sheet of compressed paper and then reducing it to vegetable fiber by removing its sizing, filling the perforations with active material or material to become active and attaching conductors, substantially as described.

Signed by me in New York city March 30, 1895.

JOHN J. ROONEY.

Witnesses:
THOMAS EWING, Jr.,
SAMUEL W. BALCH.